350-315 CROSS REFERENCE SEARCH ROOM

TELEVISION CAMERA FOR SELECTIVELY PICKING UP SCENES
IN COLOR OR MONOCHROMATICALLY
Filed May 2, 1967

United States Patent Office 3,515,800

Patented June 2, 1970

3,515,800

TELEVISION CAMERA FOR SELECTIVELY PICKING UP SCENES IN COLOR OR MONOCHROMATICALLY

Tameaki Ebihara, Yamato, and Takashi Mikami, Tokyo, Japan, assignors to Victor Company of Japan, Limited, Yokohama, Japan Filed May 2, 1967, Ser. No. 635,511
Claims priority, application Japan, May 10, 1966, 41/29,528
Int. Cl. H04n *9/06*
U.S. Cl. 178—5.4 3 Claims

ABSTRACT OF THE DISCLOSURE

A television camera for selectively picking up scenes in color or monochromatically, having an image pickup tube and a disk including a plurality of different color filters, in which the disk is connected by driven means to driving means by a belt and driven in rotation. The disk is selectively positioned to cover or uncover the front face of the image pickup tube by shifting only the driven means while keeping the connection of the belt between the driving means and the driven means so that switching between the color and monochromatic pickup is a simple operation.

The present invention relates to a television camera for use both for monochrome and color pickup of a field sequential system, and more particularly concerns a television camera having a switching means for a color filter disk.

Generally, in case where a television camera of a field sequential system is used for both monochrome and color, it is required necessary that a color filter disk be inserted into a path of light into the camera when the camera is used for color and that said disk be removed from the path of light when the camera is used for monochrome pickup. In such conventional television cameras, however, complicated operations are required when the color filter disk is inserted into or removed from the path of light into the camera.

Accordingly, one object of this invention is to obviate the abovementioned disadvantages.

Another object of the present invention is to provide a television camera capable of use for both monochrome and color by selectively inserting and removing a color filter disk into and from the path of light in a simple operation.

A further obect is to provide a television camera for use for both monochrome and color pickup by moving a color filter disk without removing it from a camera device.

Figure 1:
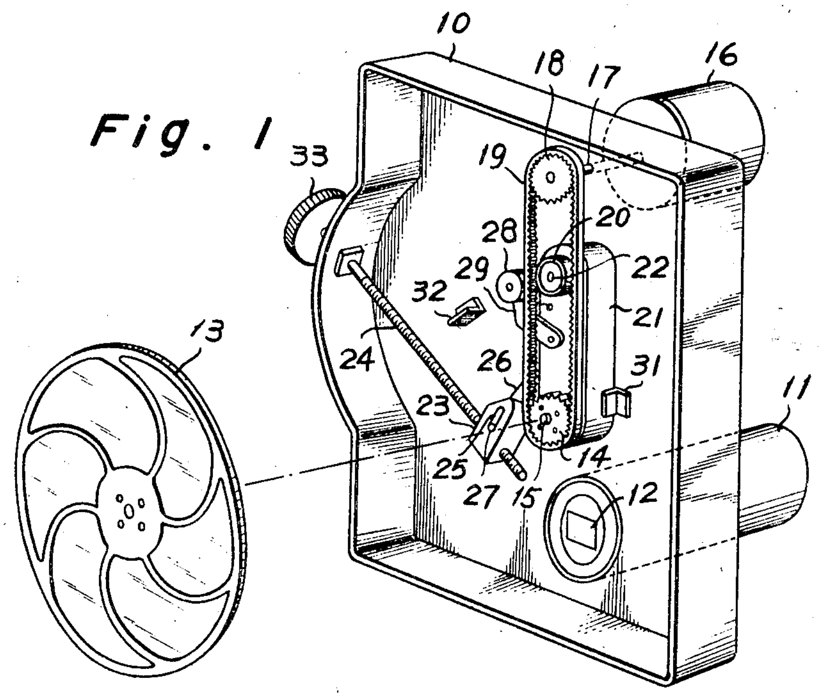
Figure 2:
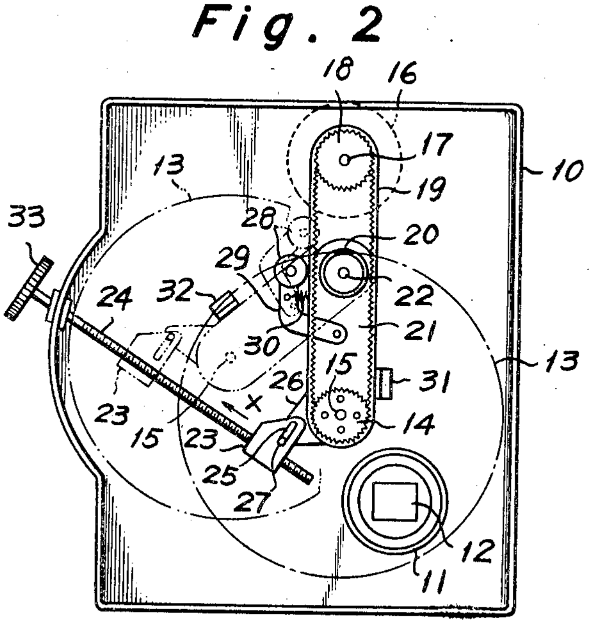

Other objects and advantages of the present invention will become apparent from the following description when considered in conjunction with the accompanying drawing, wherein;

FIG. 1 is a perspective view of one embodiment of a color filter disk changing means in a television camera for use for both monochrome and color according to the present invention; and FIG. 2 is a front view of the color filter disk changing means shown in FIG. 1.

In FIGS. 1 and 2, a case designated 10 has a front cover (not shown) at the front thereof. An image pickup tube 11 such as an image orthicon etc. has an aperture portion 12 at the front thereof. A color filter disk 13 has three-color filters of red, green and blue, and in FIG. 1 it is shown apart from a gear 14 and its axis 15 for explanation, but in practice it is fixed on said gear 14 by screws. A gear 18 is provided on the shaft 17 of a motor

16 for rotating said disk 13. An endless timing belt 19 has a toothed portion inside thereof meshing with the gears 14 and 18, respectively, to transfer the rotation of the motor 16 through the gear 18 to the gear 14. An idler wheel 20 is provided on the case 10 within the loop of said timing belt 19. On a pedestal or base plate 21 said gear 14 is mounted so as to rotate around the shaft 22 of said idler 20. A cubical nut 23 is engaged with a feeding screw 24 so as to shift in the axial direction of the screw 24 by the rotation of said screw 24. At a part of said nut 23 a notched portion 25 is provided and a pin 27 provided on a protruding portion 26 of said pedestal 21 is engaged to said notched portion 25. Another idler wheel 28 is provided on one end of an arm 29, the other end of which is pivoted on the pedestal 21 and a spring 30 is provided between the one end of the arm 29 and the pedestal 21, so that the idler wheel 28 presses against the belt 19 under the force of the spring 30 when the pedestal 21 is rotated as described later. Stoppers 31 and 32 limit the rotation of said pedestal 21 within a predetermined range. A knob 33 is provided at the outside of the case 10 for rotating said feeding screw 24.

An operation of the means constructed as described above will be explained below.

In the case where the image pickup tube 11 is used as a color tube, the gear 14 fixed with the color filter disk 13 is positioned such that said disk 13 covers the aperture portion 12 at the front of the image pickup tube 11 as shown in FIG. 2.

All the quantity of light of an object to be picked up is insufficient and the illumination is considerably low, it may be possible to pick up the object as a monochromatic image. When said image pickup tube 11 is used as a monochromatic tube, the disk 13 is removed from the path of light to said image pickup tube.

In this case, if the knob 33 is rotated in one direction, the feeding screw 24 rotates and the cubical nut 23 moves in a direction indicated by an arrow X. The base plate 21 provided with the gear 14 is rotated via the pin 27 engaged to the notched portion 25, according to the movement of said nut 23 and stopped by the stopper 32 in a position where the disk 13 is displaced from the aperture portion 12 as shown in FIG. 2 with chain line. The belt 19 is pressed against the idler 28 in the idler 20 under the force of the spring 30 so that the meshing of the belt 19 with the gears 14 and 18 is not out of mesh by contraction or expansion of the belt 19 during the rotation of the base plate 21. In the state which the rotation of the base plate 21 is stopped by the stopper 32, the belt 19 between the gears 14 and 18 is bent by the idlers 20 and 28.

Further, in the case where the image pickup tube 11 is used as a color image pickup tube after use as a monochromatic image pickup tube, said knob 33 is rotated in the reverse direction, the nut 23 moves in the reverse direction to the arrow X and the base plate 21 is stopped by the stopper 31, so that the disk 13 covers the aperture portion 12 of the image pickup tube 11 perfectly.

As stated above, the television camera of a field sequential system according to the present invention has advantages such that the color filter disk covering the front of the image pickup tube can be displaced from the image pickup tube in a simple and easy operation by the movable means arranged with means for transmitting the rotation of a rotary driving source to said disk, and that the complicated operations required in the conventional means such that the front cover of the case enclosing said disk and rotary transmission means therein are detached and the disk is then separated from or attached to the rotary shaft are not needed.

What we claim is:

1. A television camera for selectively picking up scenes in color and monochromatically comprising an image pickup tube, disk means including a plurality of different color filters, driving means, driven means including said disk, belt means connecting the driving means with said driven means to drive the latter into rotation, and means for shifting only said driven means between a first position with said disk means covering said pickup tube and a second position with said disk out of alignment with said pickup tube while maintaining the connection of the belt means between the driving means and the driven means.

2. A television camera for selectively picking up scenes in color and monochromatically comprising an image pickup tube, disk means including a plurality of different color filters, driving source means for rotating first gear means, second gear means fixed to the disk means, belt means connecting the first gear means with the second gear means, and means for shifting only said second gear means, while maintaining the connection of the belt means between the first gear means and the second gear means so that the disk means can selectively cover and uncover a front face of said image pickup tube.

3. A television camera for selectively picking up scenes in color and monochromatically comprising an image pickup tube, disk means including a plurality of different color filters, driving source means for rotating first gear means, second gear means fixed to the disk means, belt means connecting the first gear means with the second gear means, an idler wheel means positioned between the first and second gear means within the path of said belt means, and means for moving only the second gear means around a center axis of the idler wheel means while maintaining the connection of the belt means between the first gear means and the second gear means so that the disk means can be selectively moved to cover and uncover a front face of said image pickup tube.

References Cited

UNITED STATES PATENTS

| | | | |
|---|---|---|---|
| 2,761,008 | 8/1956 | Howey | 178—5.4 |
| 2,809,232 | 10/1957 | Hoyt | 178—5.4 |

ROBERT L. GRIFFIN, Primary Examiner

R. L. RICHARDSON, Assistant Examiner

U.S. Cl. X.R.

178—7.86; 350—315